J. R. AYERS.
FERTILIZER DISTRIBUTER.
APPLICATION FILED AUG. 17, 1915.

1,161,371.

Patented Nov. 23, 1915.
2 SHEETS—SHEET 1.

INVENTOR
J. R. Ayers
BY
Fred J. Dieterich
ATTORNEYS

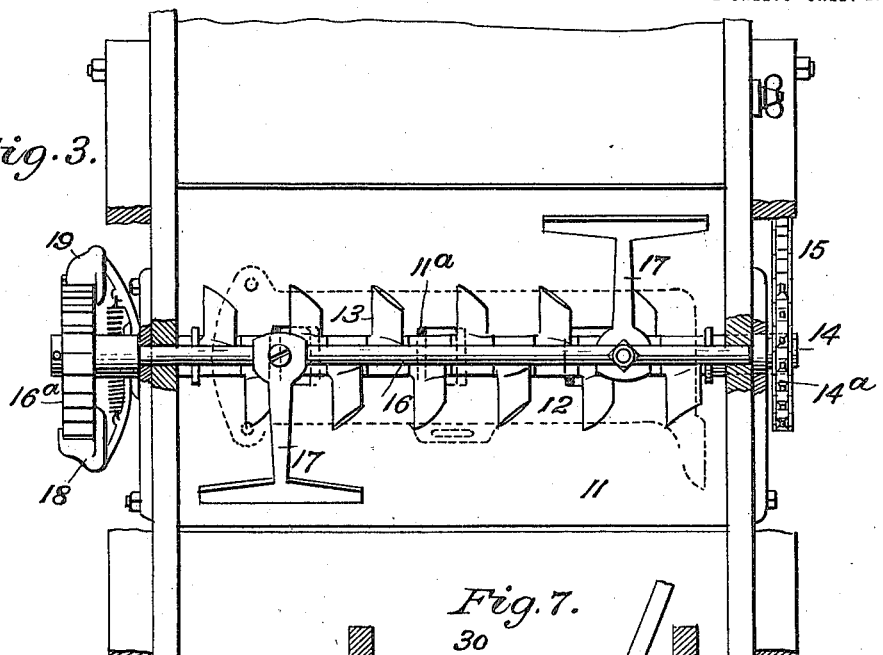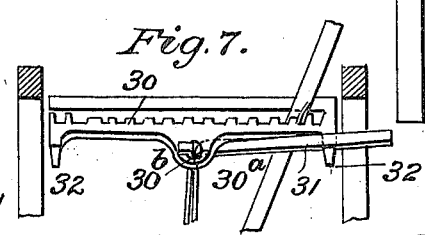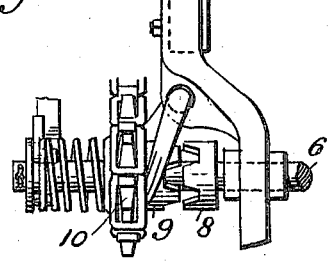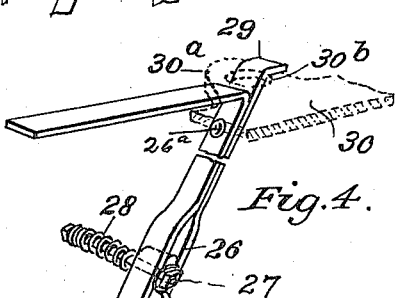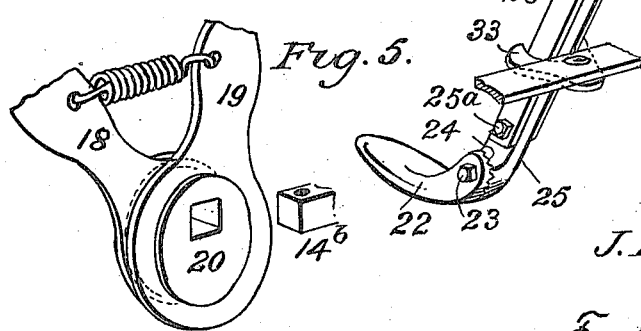

UNITED STATES PATENT OFFICE.

JAMES R. AYERS, OF PETERSBURG, VIRGINIA.

FERTILIZER-DISTRIBUTER.

1,161,371. Specification of Letters Patent. Patented Nov. 23, 1915.

Original application filed August 12, 1915, Serial No. 45,191. Divided and this application filed August 17, 1915. Serial No. 45,993.

*To all whom it may concern:*

Be it known that I, JAMES R. AYERS, residing at Petersburg, in the county of Dinwiddie and State of Virginia, have invented certain new and useful Improvements in Fertilizer-Distributers, of which the following is a specification.

My present invention, which relates generally to machines for distributing or sowing fertilizer, more particularly has reference to certain features disclosed in my co-pending application for Letters Patent for improvements in guano sowers, Serial No. 45,191, filed August 12, 1915, and of which application this application forms a divisional part.

My present invention primarily has for its object to provide an improved construction of guano sower in which is included, in connection with the usual type of coverer disks, for turning over the furrow after the seed is planted, a hoe or mixer member located between the fertilizer discharges of the hopper and the rear or coverer disks, which, under one adjustment acts as a hoe or plow for loosening up the bottom of the furrow and mixing the fertilizer with the ground and under another adjustment, to which it is set when transporting the machine across the field, is reversed and so positioned that it curves backward and becomes a skid or runner to carry the weight of the rear end of the machine and for lifting the coverer disks above the ground.

Another object of my present invention is to provide, in a guano sower of the general character stated, in combination with a ground wheel at the forward end of the machine and a hopper having one or more discharging passages in its bottom; means for rapidly agitating the fertilizer material within the hopper, at a point just above the discharge passage or passages to effect the desired feed of the material through the said passage or passages and other means for stirring up the bulk of the fertilizing material above the agitator, at a relatively slow speed for breaking up possible bridging or clogging above the agitator means and for avoiding danger of heating the said material and rendering the said material sticky or pasty.

Figure 1:
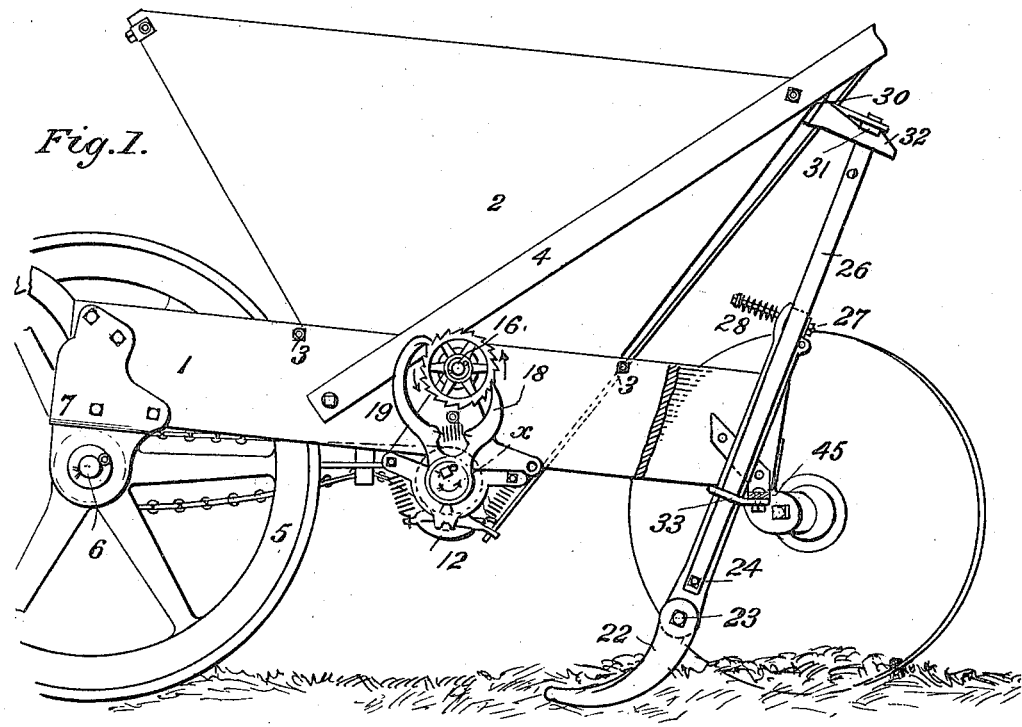
Figure 2:
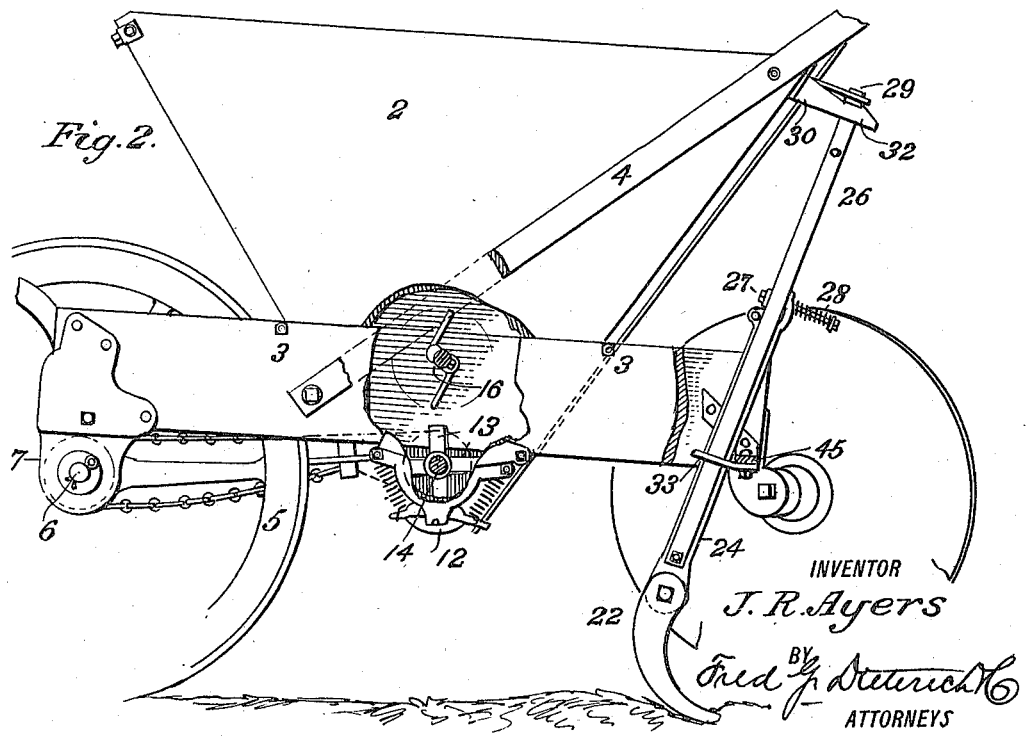

With other objects in view that will hereinafter appear, the present invention embodies the peculiar features of construction and novel combination of parts hereinafter fully explained, specifically pointed out in the appended claims and illustrated in the accompanying drawings, in which:

Figure 1 is a side elevation of so much of my complete improved guano sower necessary to illustrate the practical application of the parts constituting my present invention, the combined hoe and skid mechanism being shown at the normal or furrow loosening position. Fig. 2 is a like view of the said parts, the combined hoe and skid devices being shown in the reversed or "skid" position, with the covering disks out of the ground. Fig. 3 is a plan view partly in section of a portion of the hopper, the fertilizer agitating and the fertilizer stirring means. Fig. 4 is a detail perspective view of the combined hoe and skid devices. Fig. 5 is a detail view of the crank or eccentric connection for the pawls that actuate the ratchet gear on the stirrer shaft. Fig. 6 is an end elevation of the clutch devices on the ground wheel axle hereinafter referred to. Fig. 7 is a detail perspective view of the rack bar devices hereinafter referred to.

In carrying out my present invention, the framing of the machine is preferably of six inch wooden boards and includes two side members 1—1 that extend the full length of the machine and upon which the hopper body 2 is mounted, the sides of the latter being braced or clamped by cross bolt rods 3—3 and the handle members 4—4 that are secured in the manner clearly shown in the drawing.

5 designates a ground wheel located between the front ends of the side pieces 1—1 and whose axle 6 journals in the metal brackets 7—7, pendent from the said side pieces, and the said axle, which is extended at one end, carries a fixed clutch member 8, for engaging with the clutch portion 9 of a shiftable sprocket wheel 10 mounted on the axle extension, as is best shown in Fig. 6, and which, in the complete construction of my present improved guano sower is adapted for being engaged by the hand lever controlled devices, such as are fully illustrated and described in my co-pending application before referred to, and since the said clutch shifting devices form no part of my present invention, a further detailed description of the same in this application is deemed unnecessary.

In my present invention, the hopper has a sheet iron bottom 11 provided with one or more discharging apertures 11ᵃ that are opened or closed by a metal gate 12 that rides over the bottom of the said hopper, and is suitably mounted for operative engagement with the hopper.

13 designates, what I term, a combined agitator and feeding means for keeping in motion the fertilizer and crowding it to the discharge opening or openings in the hopper bottom, and at this point, it should be stated, that when sowing guano, particularly for peanut planting, to obtain the desired distribution of the fertilizer, the guano should be fed relatively fast through the discharge openings and hence the agitator devices operating over the said openings must rotate at a relatively fast speed.

In my present invention, the agitator devices are mounted to rotate in the horizontal plane over the hopper passages, and one end of the shaft 14 of the said agitator carries a sprocket gear 14ᵃ over which takes an endless sprocket chain 15 that takes over the sprocket wheel 10 from which motion is imparted to the agitator, for driving the same at a relatively fast speed, it being understood that when the clutch devices in the power transmission from the ground wheel axle are shifted to throw out the wheel 10, no motion is imparted to the agitator and stirrer devices, which remain inert while transporting the machine across the field.

In my present machine, the stirrer devices are mounted over the agitator devices and comprise a rotary shaft 16 and radial beater or stirrer blades 17, and the said shaft 16 extends beyond the hopper at one end and carries a ratchet wheel 16ᵃ with which engage a pair of oppositely disposed pawls 18—19, one of which acts as a push and the other a pull pawl and they are mounted on an eccentric hub 20 held upon a stud 14ᵇ that extends from the outer end of the agitator shaft 14 (see Fig. 4) the several parts being coöperatively so combined that as the agitator shaft rotates in the direction of the arrow $x$, (Fig. 1) a slow rocking movement is imparted to the two pawls 18 and 19, which engaging the ratchet disk on the stirrer shaft impart an intermittent, slow rotation to the said stirrer shaft, and in consequence imparts a relatively slow rotation to the stirrer from the relatively fast motion of the agitator shaft, the parts as shown in the drawings being so proportioned, that the speed reduction between the agitator and the stirrer is on a ten to one ratio, the agitator making, as it were, ten complete rotations as the stirrer arms or blades make one complete rotation through the fertilizer bulk, the movement of the stirrers being sufficient to keep the fertilizer bulk loosened and in motion without danger of heating it up and rendering it sticky.

Referring now more particularly to Figs. 1, 2 and 4, it will be noticed that the combined mixer and skid means hereinbefore referred to, consists of a curved plow or hoe-like foot member 22 that is rockably mounted on a stud bolt 23 that takes through the plow which, as also the controlling face of the said member 22, is serrated as at 24 to hold the member 22 to its set positions.

Shank 25 is fulcrumed on a stud bolt 25ᵃ that takes through the lower ends of a pair of strap iron hangers 26—26, that straddle the shank 25 and whose upper ends are joined and made fast to each other by a clamp bolt 26ᵃ. Shank 25 also has its upper end slotted for slidably engaging a stud bolt 27 carried between the hangers 26 and on which is mounted a buffer spring 28 for taking up shocks imparted to the member 22.

By referring to Fig. 7, it will be noticed that one of the hangers 26 that form the plow standard or shank extends through and is rotatably mounted in the aperture 30ᵃ formed in the rearwardly extending ear 30ᵇ of a rack bar 30, formed on a casting secured to the upper end of the hanger 26 that passes through the ear 30ᵇ is bent over at right angles, hooks over the ear 30ᵇ and holds the standard that carries the combined hoe and skid from sliding down in its bearings. The other hanger member 26 is of greater length than the hanger that passes through the ear 30ᵇ and the upper end thereof is bent at right angles to form a long lever 31, the bend of the said hanger being just below the ear 30ᵇ so that the lever 31 engages the under side of the said ear 30ᵇ and serves to hold the standard from sliding upwardly in its bearings.

Lever arm 31 is adapted for being swung over for engaging with either of a pair of notched locking fingers 32 that project rearwardly from each end of the rack bar 30, see Figs. 1 and 7, by reference to which and to Fig. 5, it will be noticed the lower ends of the strap iron hangers 26 and the shank member mounted therebetween are held within the arms of a bifurcated bracket 33 secured to the cross brace 45 that joins the rear end of the opposite side members of the frame.

By reason of mounting the combined mixer, hoe and skid in the manner shown and described, when the parts are assembled as shown in Fig. 1, the lever arm 31 is swung over to engage the notched finger 32, as shown in Fig. 1, and when thus adjusted the member 22 acts as a turning plow for loosening up the furrow as the machine is moved forwardly when sowing the fertilizer, and when the said member 22 is reversed and held locked to such position, (see Fig. 7) by the lever 31 now engaging the notched finger at the other side of the rack, the rear or coverer disks are lifted from the ground and the member 22 bears the weight of the rear end of the machine and acts as a skid when conveying the machine across the field (see Fig. 2).

From the foregoing taken in connection with the accompanying drawings, the complete construction, the operation and the advantages of my improved machine will be readily understood by those skilled in the art to which the said invention relates.

The lever device for operating the slidable gate for controlling the discharge passages from the hopper, the manner in which the said lever is fulcrumed and the power transmission means generally shown in the drawings of this application are not herein described in detail, since they are fully set out in my co-pending applications above referred to and since they, *per se*, form no part of the present invention, as set out in the appended claims.

What I claim is:

1. In a fertilizer sower, a frame, a ground wheel and cover disks supporting said frame, a distributing hopper carried by the frame, a rotatable standard mounted at the rear of the discharge place of said hopper, means by which said standard may be rotated, a plow skid carried by said standard, means for holding said standard to maintain said plow skid in either its plowing or skidding position, substantially as shown and described.

2. In a guano sower, the combination with the distributing hopper having a discharge outlet and the covering disks, of a standard located between said covering disks and the hopper, means for supporting said standard for rotative adjustment, a plow skid mounted on said standard and adapted to be held in a plowing position or a skidding position accordingly as said standard is in one position of adjustment or another, means for holding said standard in its positions of adjustment, and means for holding said standard from displacement in the direction of its length.

3. In a guano sower of the character described, the combination with the framing, a ground wheel and coverer disks respectively mounted at the front and rear ends of the frame, a hopper located between the ground wheel and the coverer disks, and means on the hopper for discharging the guano therefrom; of a standard rotatably mounted between the hopper and the coverer disks, a curved shoe mounted on the lower end of the standard that serves as a plow when the standard is adjusted to one position, and as a skid for taking up the weight of the rear end of the machine when the standard is adjusted reverse to the other mentioned position.

4. In a guano sower of the character described, the combination with the distributing hopper including means for discharging the fertilizer through the bottom thereof, the covering disks located to the rear of the hopper and the ground wheel in advance of the said hopper; of a standard located between the covering disks and the hopper, upper and lower bearings in which the standard is rotatably mounted, said standard including a shank, a curved shoe on the lower end of the shank shaped to serve as a plow when the standard is turned to one position and as a skid to take up the weight of the rear end of the machine when the standard is turned to a reversed position.

5. In a guano sower of the character described, the combination with the distributing hopper including means for discharging the fertilizer through the bottom thereof, the covering disks located to the rear of the hopper and the ground wheel in advance of the said hopper; of a standard located between the covering disks and the hopper, upper and lower bearings in which the standard is rotatably mounted, said standard including a shank, a curved shoe on the lower end of the shank shaped to serve as a plow when the standard is turned to one position and as a skid to take up the weight of the rear end of the machine when the standard is turned to a reversed position, and means for holding the standard against vertical movement in its bearings.

6. In a guano sower of the character described, the combination with the distributing hopper including means for discharging the fertilizer through the bottom thereof, the covering disks located to the rear of the hopper and the ground wheel in advance of the said hopper; of a standard located between the covering disks and the hopper, upper and lower bearings in which the standard is rotatably mounted, said standard including a shank, a curved shoe on the lower end of the shank shaped to serve as a plow when the standard is turned to one position and as a skid to take up the weight of the rear end of the machine when the standard is turned to a reversed position, the said standard comprising strap hangers whose lower ends straddle and are made fast to the plow shank, the upper end of one of the hangers being rotatably held in the aforesaid upper bearing, the upper end of the other hanger being bent at right angles to form a hand lever for turning the standard and means for holding the lever locked to its reversed positions.

7. In a guano sower of the character described, the combination with the frame, the ground wheel and the coverer disks located respectively at the front and rear ends of the frame, a hopper mounted on the frame between the ends thereof, and means within the hopper for discharging the fertilizer; of a standard rotatably mounted on the rear of the hopper, said standard comprising a pair of strap iron hangers whose upper ends are joined, a shank rockably mounted between the said hangers, a spring buffer connection that joins with the upper end of the shank and the hangers, a curved foot piece adjustably mounted on the lower end of the shank, said foot piece forming a plow under one adjustment of the standard, and a skid for taking up the weight of the rear end of the machine when the standard is adjusted to another position, bearings on the frame and the hopper in which the standard is mounted, means on the standard for holding it from longitudinal movement in the bearings and other means for effecting the rotation of the standard and holding it to its adjusted position.

JAMES R. AYERS.

Copies of this patent may be obtained for five cents each, by addressing the "Commissioner of Patents, Washington, D. C."